United States Patent [19]

Paul

[11] 4,192,252
[45] Mar. 11, 1980

[54] APPARATUS FOR APPLYING LIQUID TO CONTINUOUSLY ADVANCING FILAMENTS

[75] Inventor: Francis R. Paul, Aiken, S.C.

[73] Assignee: Owens-Corning Fiberglas Corporation, Toledo, Ohio

[21] Appl. No.: 5,752

[22] Filed: Jan. 23, 1979

[51] Int. Cl.² .............................................. C03B 37/02
[52] U.S. Cl. .................................... 118/258; 65/3 R; 65/11 W; 118/602
[58] Field of Search ...................... 118/258, 257, 602; 65/3 R, 3 C, 11 W

[56] References Cited

U.S. PATENT DOCUMENTS

| | | | |
|---|---|---|---|
| 2,873,718 | 2/1959 | Brautigam | 65/11 W |
| 3,331,353 | 7/1967 | Sears et al. | 118/257 |
| 3,811,834 | 5/1974 | Schwemmer et al. | 118/258 X |
| 3,828,724 | 8/1974 | Korodi | 118/258 |

Primary Examiner—Robert L. Lindsay, Jr.
Attorney, Agent, or Firm—Ronald C. Hudgens; Philip R. Cloutier; Greg Dziegielewski

[57] ABSTRACT

Apparatus for applying liquid to advancing filaments is comprised of a pair of nestable containers having specific liquid control portions for improved excess liquid capture and recycling.

5 Claims, 2 Drawing Figures

APPARATUS FOR APPLYING LIQUID TO CONTINUOUSLY ADVANCING FILAMENTS

BACKGROUND OF THE INVENTION

In the production of continuous glass filaments, it is the general practice to apply a liquid size or binder to the advancing array of filaments as they are pulled from the bushing before being gathered into a strand or strands. Some of these size applicator systems incorporate a rotatable roll for transferring the liquid from a reservoir to the advancing filaments.

It is, generally, necessary to maintain a fresh supply of size and/or binder in the reservoir associated with the roll to apply a suitable coating to the filaments. As such, an excess of liquid is generally supplied to the reservoir during operation. Yet, economic and safety considerations dictate that the excess liquid be collected and recycled if at all possible.

U.S. Pat. No. 4,015,559 issued to Sears et al. on Apr. 5, 1977, discloses an applicator system wherein a dual tray or reservoir assembly is employed in a roll type applicator for collecting and recirculating the excess liquid. The instant invention modifies the dual container aspects thereof to improve the operating characteristics of such applicators.

SUMMARY OF THE INVENTION

Apparatus is provided for applying liquid to filaments comprising: a movable surface adapted to supply said liquid to said filaments; a first container adapted to supply said liquid to said applicator surface, said first container comprising a bottom wall, a front wall having an upper edge extending along the length of said surface, a rear wall having a vertically oriented flow control means, the lower edge of said control means extending below said bottom wall, the upper edge of said control means being lower than the upper edge of said front wall; and a second container adapted to accommodate said first container to receive said liquid moving along the exterior of said first container, said second container having a forwardly angled front portion, a rear portion, side portions, and baffle means intermediate said sidewalls, said baffle means having at least one recess therein to permit said liquid to pass therethrough while retaining sinkable or settleable foreign matter within a settling zone formed between said baffle means and one of said sidewalls and while retaining floatable foreign matter within said zone, said flow control means being positioned to direct excess fluid moving therethrough into said settling zone.

An object of the present invention is to provide an improved system for applying liquid to advancing filaments.

The foregoing, as well as other objects of the present invention, will become apparent to those skilled in the art from the following detailed description.

DESCRIPTION OF THE INVENTION

Figure 1:
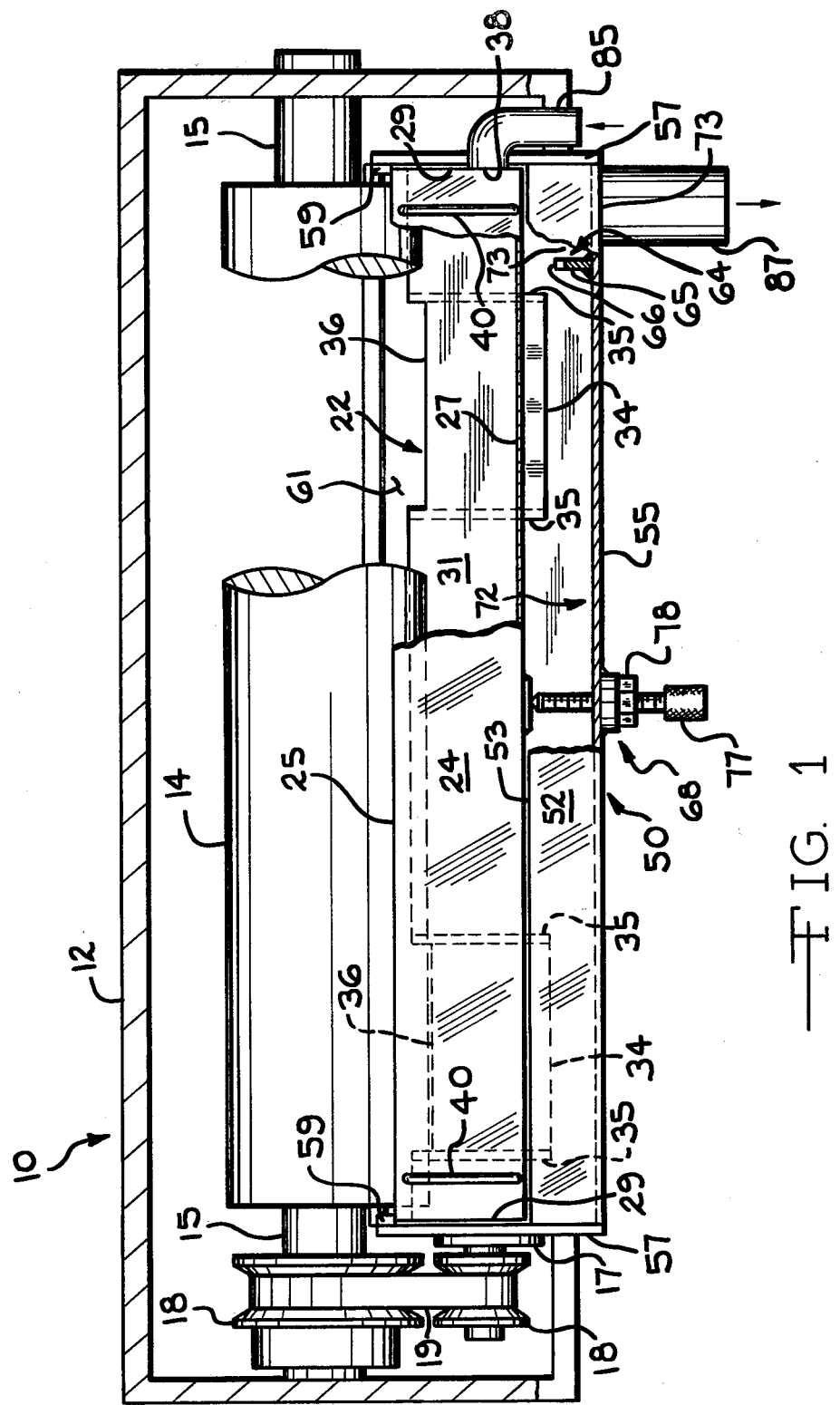
FIG. 1 is a frontal view of a size applicator according to principles of the present invention.
Figure 2:
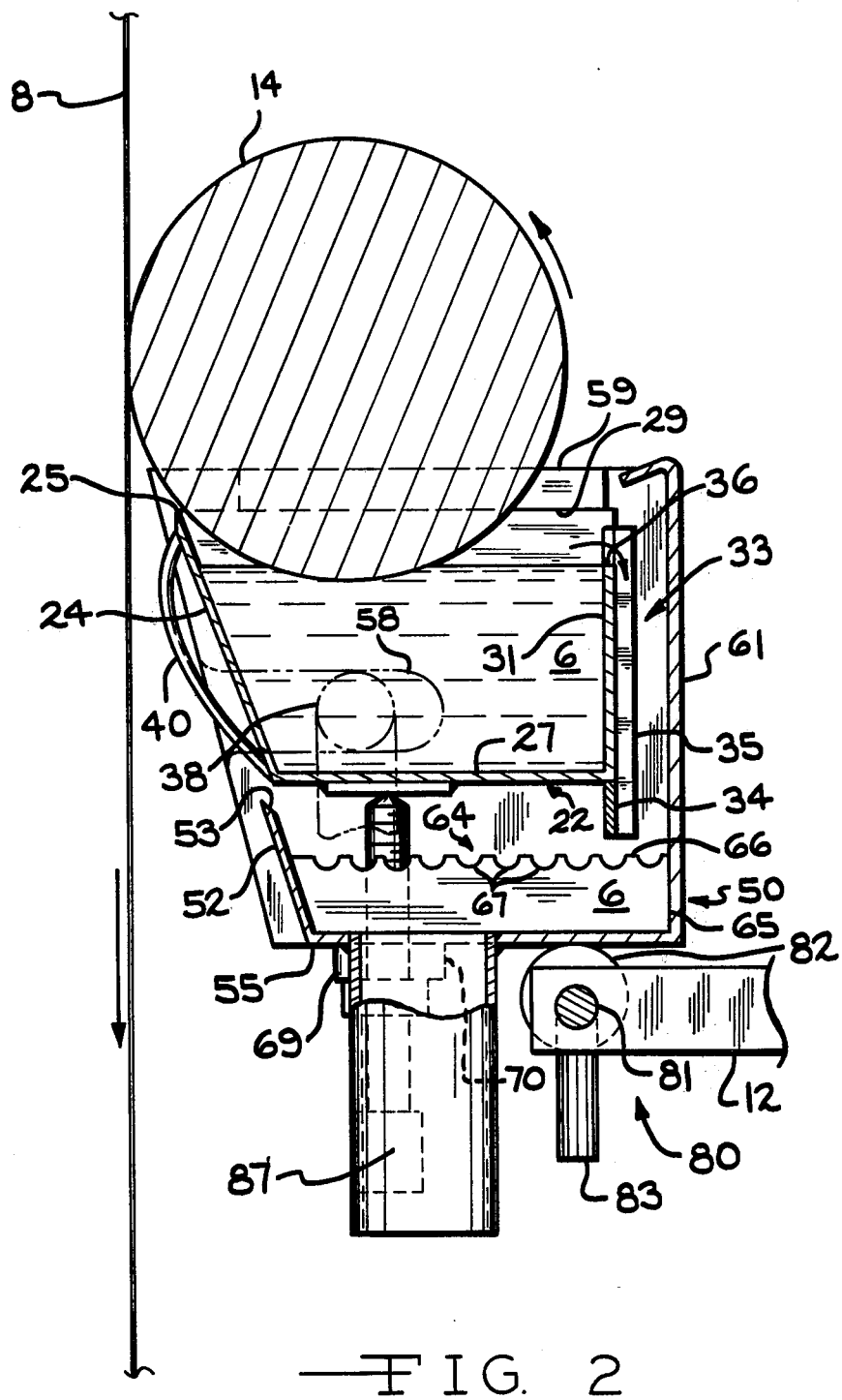
FIG. 2 is a sectionalized side view of the applicator shown in FIG. 1.

As shown in FIGS. 1 and 2, size applicator assembly 10 is adapted to supply liquid size and/or binder 6 to the array of advancing filaments 8 as is known in the art.

Applicator 10 is comprised of housing 12 having an application surface or roll 14 rotatably journaled therein at shafts 15 extending from roll 14. It is to be understood that the application surface can be a belt type applicator as well as a roll type applicator.

Roll 14 is driven by motor 17 by means of pulleys 18 and belt 19. Generally, the roll is driven such that the surface of the roll 14 in contact with the filaments 8 is moving in the same direction as the filaments. However, in some instances the roll can be driven counter to the advancement of the filaments.

First container 22 is mounted with respect to housing 12 and roll 14 such that during operation the surface of roll 14 is partially immersed in the body of liquid 6 in container 22.

First container 22 is comprised of a front wall 24 having an upper edge 25 extending along the length of roll 14, a bottom wall 27, sidewalls 29, and a rear wall 31 suitably joined together to form a reservoir for holding liquid 6. First container 22 also includes a vertically oriented liquid flow control channel means 33 comprising a plate 34 attached to rear wall 31 and a pair of bars projecting laterally beyond the exterior surface of plate 34 to form the channel. Channel means 33 is oriented such that the upper lip 36 thereof is positioned in a horizontal plane below the upper edge 25 of front wall 24.

As shown in FIG. 1 a pair of channel means 33 are located at the rear wall 31. In operation, as an excess of liquid 6 is supplied to first container 22 at liquid inlet port 38 located in one of the sidewalls 29, the excess liquid flows over the upper lip 36 of channel means 33 and downwardly into settling zone 72 of second container 50.

Second container 50 is adapted to slideably receive first container 22 and to capture the excess liquid from first container 22 and any spray thrown from the filaments or the like deposited on the front wall 24 of first container 22. Second container 50 is mounted within housing 12 by positioning means 80.

Second container 50 is comprised of a front portion 52 extending outwardly or forwardly from bottom portion 55 joined thereto. Second container 50 also includes side portions 57, one of which has recess 58 located therein to accommodate inlet tube 85 joined at liquid inlet port 38 of sidewall 29 of first container 22.

Each side portion 57 has a projection 59 extending inwardly toward each other adapted to accommodate each of the sidewalls 29 such that securement means 68 positions the sidewalls 29 against projections 59 to adjustably locate first container 22 within second container 50.

Baffle means 64 which is comprised of plate 65 securely joined to front portion 52, bottom portion 55, and rear portion 61 of container 50 divides the lower region of the second container 50 into a settling zone 72 and an outlet region 73.

Plate 65 has a serrated upper edge 66 comprised of a plurality of slots or recesses 67 along the length thereof. Perferably, the slots are approximately 1/16 inch wide and extend from the top edge of plate 65 to within about ⅛ inch from the bottom edge of plate 65 adjoining bottom portion 55 and are about ¼ inch apart along the length of plate 65. This permits contaminants in the excess liquid delivered to zone 72 to collect in the settling zone beneath the lower edge of the slots 67 if the contaminants have a density greater than the density of the liquid 6 (i.e., sinkable). During operation, floating foreign matter can also form on the surface of liquid 6 in settling zone 72. The serrated upper edge 66 provides a means for retaining the floating matter within the zone and yet permit the liquid 6 to flow into the outlet region 73 to outlet tube 87 through outlet 74 located in bottom portion 55. Thus, the sinkable and floatable foreign matter or contaminants are retained in the settling zone 72 for periodic removal by the operator. Thus, the foreign contaminants are removed from the excess liquid before being recycled.

First container 22 is positioned within second container 50 such that the upper rim 53 of front portion 52 extends outwardly beyond the junction of the front wall 24 and bottom wall 27 to collect any excess liquid flowing down front wall 24. Also first container 22 incorporates a handle means 40 comprising a pair of curved bars adapted to direct any liquid on the handle means along the front wall 24 and/or into the second container 50. The handles 40 are adapted to provide the operator with a convenient means for removing, inserting and adjusting the first container 22 in second container 50.

Securement means 68, which urges the sidewalls 29 into projections 59 to frictionally retain the first container 22 in second container 50, is comprised of a boss 69 on bottom portion 55 having a threaded hole 70 to receive screw 77 which is adapted to contact bottom wall 27 and urge first container 22 upwardly into projections 59. It is preferred that the bottom wall 27 have a boss or landing section to receive screw 77. Screw 77 is locked into place by any suitable means such as locking nut 78.

As shown in FIG. 2, positioning means 80 for locating second container 50 within housing 12 is comprised of a shaft extending along the length of second container 50. Shaft 81, which is rotatably mounted in housing 12, has an eccentric cam 82 thereon such that as arm 83 of shaft 81 is rotated, the surface of cam 82 urges the second container 50 into fixed engagement with housing 12.

It will be appreciated that variations in constructional features as well as substitution of equivalent components and methods can be undertaken without departing from the spirit and scope of the present invention.

I claim:

1. Apparatus for applying liquid to filaments comprising:
   a rotatable surface adapted to supply said liquid to said filaments;
   a first container adapted to supply said liquid to said applicator surface, said container comprising a bottom wall, a front wall having an upper edge extending along the length of said surface, a rear wall having a vertically oriented flow control means, the lower edge of said control means extending below said bottom wall, and the upper edge of said control means being lower than the upper edge of said front wall; and
   a second container adapted to accommodate said first container to receive excess liquid on the exterior of said first container, said second container having a forwardly angled front portion, a rear portion, side portions, and baffle means intermediate said sidewalls, said baffle means having at least one recess therein to permit said liquid to pass therethrough while retaining sinkable foreign matter within a settling zone formed between said baffle means and one of said sidewalls and while retaining floatable foreign matter within said zone, said flow control means being positioned to direct excess liquid moving therethrough into said settling zone.

2. The apparatus of claim 1 wherein said front wall and said front portion are oriented to direct said liquid on said front wall into said second container.

3. The apparatus of claims 1 or 2 wherein each of said side portions has a projection adapted to receive a sidewall of said first container and further comprising a securement means adapted to adjustably locate said first container within said second container.

4. The apparatus of claim 3 further comprising a handle means joined to said first container adapted to direct liquid thereon into said second container.

5. The apparatus of claim 4 wherein said front portion of said second container is oriented such that the upper edge thereof extends outwardly beyond the junction of the front wall and bottom wall of said first container.

* * * * *